June 28, 1966  H. A. BLOMQUIST  3,257,728
ASTRONOMICAL INSTRUMENT
Filed July 15, 1964  2 Sheets-Sheet 1
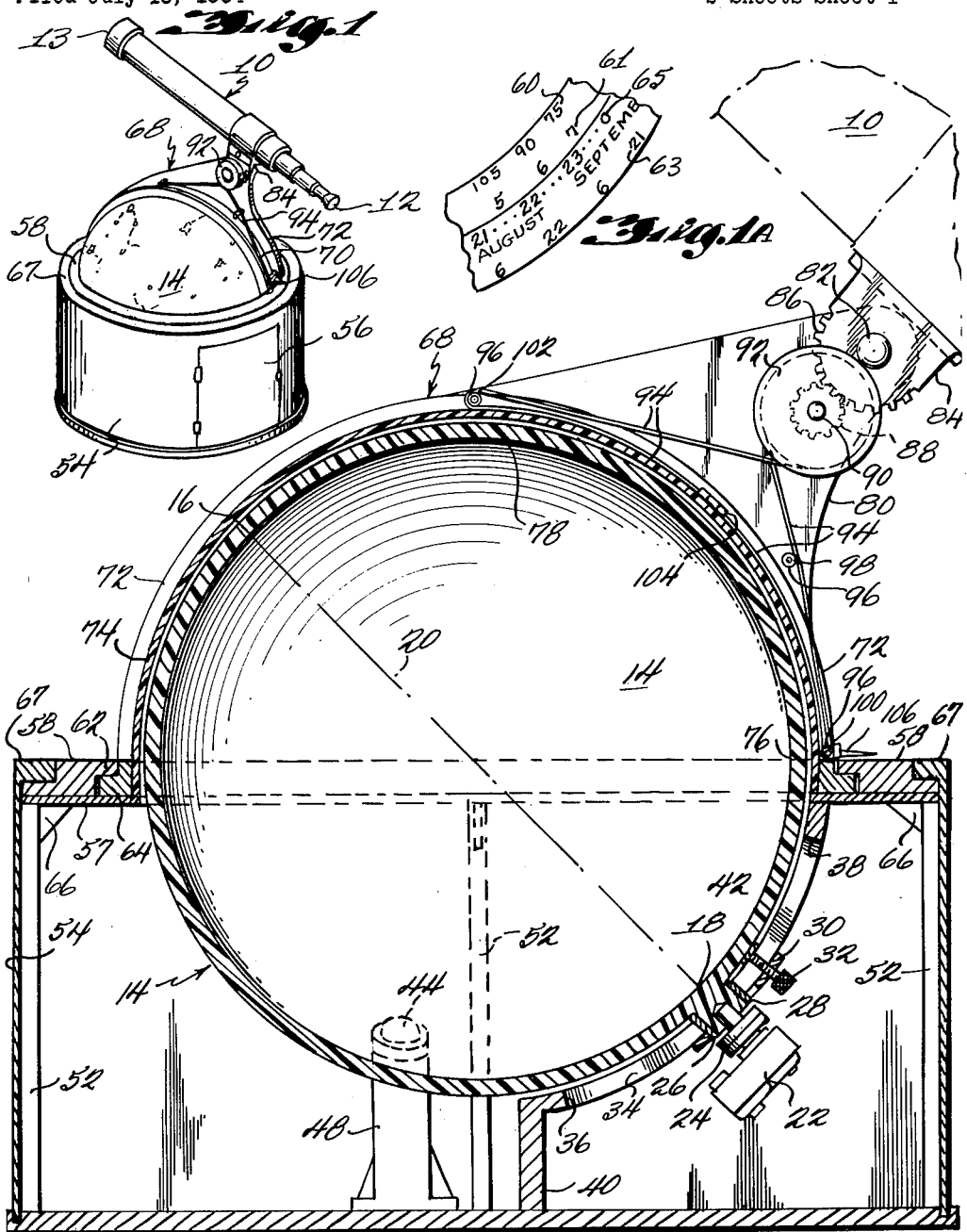
INVENTOR
HERBERT A. BLOMQUIST
BY
Cushman, Darby & Cushman
ATTORNEYS June 28, 1966 H. A. BLOMQUIST 3,257,728
ASTRONOMICAL INSTRUMENT
Filed July 15, 1964 2 Sheets-Sheet 2
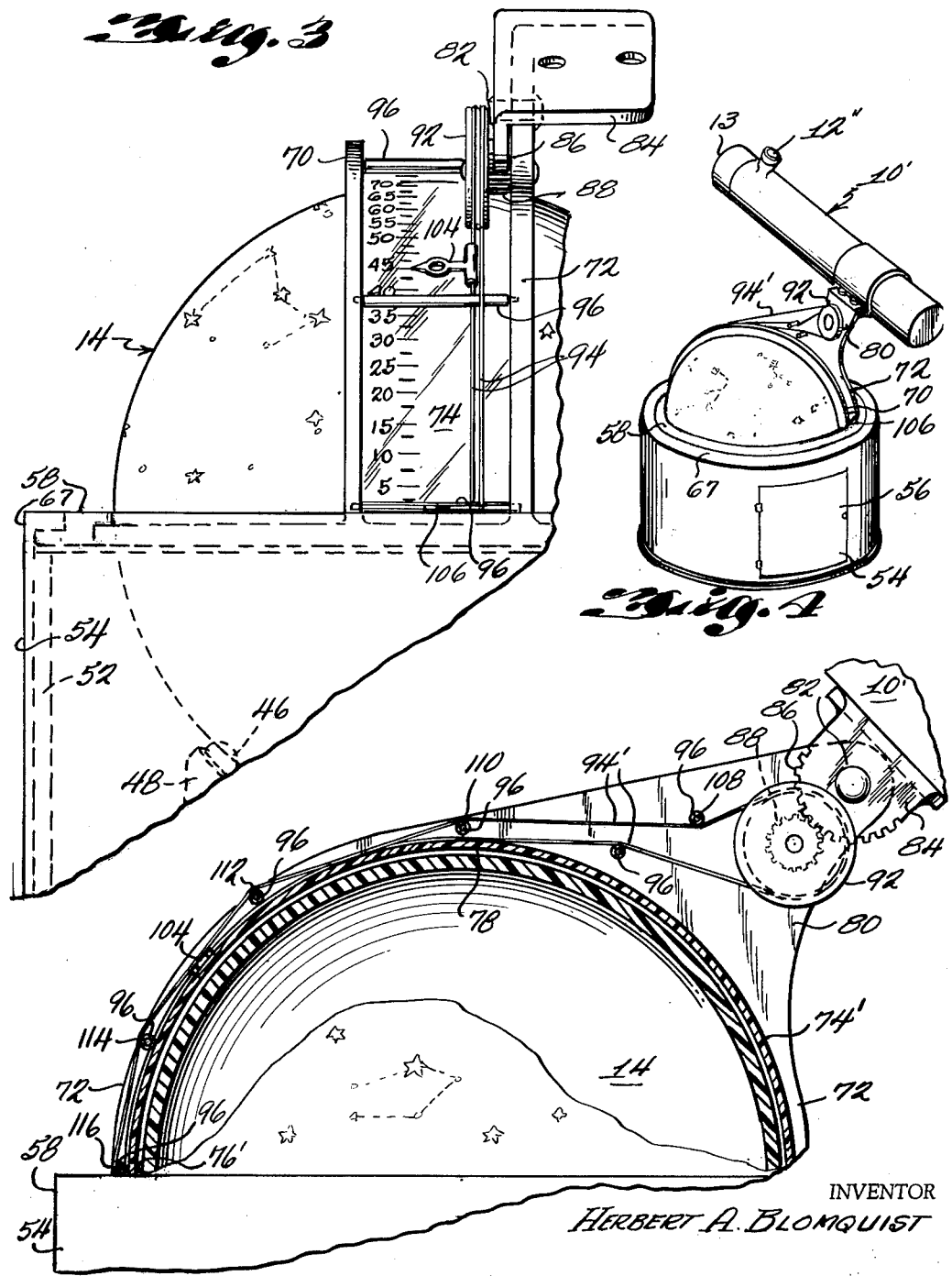
INVENTOR
HERBERT A. BLOMQUIST
BY Cushman, Darby & Cushman
ATTORNEYS United States Patent Office 3,257,728
Patented June 28, 1966

3,257,728
ASTRONOMICAL INSTRUMENT
Herbert A. Blomquist, Bernardino dos Santos 54/101,
Santa Tereza CZ 45, Rio de Janeiro, Brazil
Filed July 15, 1964, Ser. No. 382,829
15 Claims. (Cl. 33—61)

This invention relates to astronomy and more particularly to an instrument for mounting a sighting tube, with or without optical fitments, in such a manner as to facilitate the location and identification of heavenly bodies.

One of the objects of this invention is the provision of such an instrument which is useable in any part of the world to locate or identify any heavenly body with the greatest of ease and comfort, eliminating any need for moving from one side of the instrument to the other to sight a heavenly body and read the corresponding body on the globe used in the instrument. This object is accomplished with simplified equipment that does not require any particular type of telescope such as a periscope, but which can use any conventional refracting or reflecting type of telescope or simple sighting tube.

Other objects and advantages of this invention will become apparent to those of ordinary skill in the art upon reading the appended claims and the following detailed description of various embodiments of the invention, in conjunction with the attached drawings, in which:

FIGURE 1 is a perspective view of an embodiment using a refracting telescope;

FIGURE 1A is a fragmentary plan view of a portion of scales used in the FIGURE 1 equipment;

FIGURE 2 is a cross-sectional view of the FIGURE 1 embodiment;

FIGURE 3 is a partial elevational view of the embodiment of FIGURES 1 and 2;

FIGURE 4 is a perspective view of another embodiment of the invention, using a reflecting telescope, and FIGURE 5 is a partial side elevational and partial cross-sectional view of the FIGURE 4 embodiment.

The arrangement shown in FIGURE 1 is suitable for a simple pointer or sighting tube or employs a refracting type of telescope 10 which has its eyepiece 12 at the end opposite end 13 which is directed toward the heavens. This arrangement is illustrated in more detail in FIGURE 2.

Employed in the arrangement is any standard plastic, metal or cardboard globe 14 which has an ordinary globular star map with the star arrangements thereon being in the same relation to its north pole 16 and south pole 18 as the actual heavenly bodies have to the north and south celestial poles. Arrangements are provided to rotate globe 14 about its pole axis 20 at the rate of once every 23 hours, 56 minutes. This is accomplished by a sidereal clock or motor 22, which may be of conventional form. Its shaft extends through a gearing box 24 into a journal 26 that protrudes from the south pole point of globe 14. A bearing 28 couples the journal to a plate 30 which, along with a bolt arrangement 32 releasably secures the globe at any desired axial elevation between approximately 10° and 80°, more or less, according to the length of slot 34 between its lower end 36 and its upper end 38 in the support member 40. Bolt 32 is threaded in plate 30, and when the bolt is tightened, its lower plate 42 in which the bolt swivels, is jammed up into the slot in order to secure the axis of the globe at the desired angle. Of course, support 40 may be moved leftward in FIGURE 2 so that slot 34 cradles the entire underside of the globe whereby globe axis 20 may be positioned vertically. Further, in order to reduce the polar angle to 0°, the extension of plate 30 and bolt assembly 32 may be placed on the lower side of gear box 24 and clock 22 may also be lowered in position through a displaced axis gearing arrangement. Further support of the globe is accomplished by two ball bearings 44 and 46 (see FIGURES 2 and 3) which are supported on respective stands 48. Rollers of rubber may be used in place of the ball bearings, if desired.

These stands 48, as well as support 40, are secured to a circular base 50 from which extend upwardly several supporting rods 52 spaced along the outer edge of the base. Surrounding these supporting rods and rotatable in a groove in base 50 is a cover or sheet 54 which has a hinged panel 56 to permit access to the adjusting bolt 32 and clock mechanism.

Supported atop rods 52 is a base ring 57 on top of which is a fixed retaining ring 58 on which, as best seen in FIGURE 1A, are etched or otherwise disposed azimuth markings 60 around the inner circumference, and time markings 61 showing hours and minutes of the day around the outer circumference. As shown in FIGURE 2, ring 58 has an upper part 62 which projects inwardly over the outward projection of a revolvable ring 64. This latter ring is rotatable on the supporting ring 57, which is braced to rods 52 by braces 66. The outer circumference of ring 58 is recessed to receive the overlapping ring 67 which is secured to or an extension of cover 54 and therefore rotates therewith. Around its outer circumference, ring 67 may have markings 63 showing the months of the year and the days of the month with the related sidereal time being indicated by marking 65 on the inner circumference. Rings 58 and 67 therefore form a type of circular slide rule by which may be determined the sidereal time on any day at any hour, within a few minutes accuracy. This is of great convenience in positioning the globe for observation of the stars.

Secured to the revolvable ring 64 is a superstructure 68 in the form of spaced frame members 70 and 72 (see FIGURE 3). These frame members straddle globe 14 and connect on opposite sides of the rotatable ring 64, in any suitable manner. Extending between frame members 70 and 72 and secured on the underside thereof, is a plastic or other type transparent sheet 74 on which are degree markings from 0° to 90°, i.e., between the rear equator point 76 or waistline of the globe and its zenith 78 as it is presently situated. For light telescopes and the like, frame member 70 can be omitted, if desired, and sheet 74 could then be anchored to ring 64.

Protruding upwardly from frame member 72 is an extension plate 80 which has pivoted on it about shaft 82 a telescope mounting bracket 84 which extends upwardly and then to the side for holding the telescope. As indicated, this bracket has gear teeth 86, which mesh with a smaller gear 88. This latter gear is secured on a shaft 90, which also carries a grooved disc or pulley 92. Wrapped around the pulley is a cable rope or cord 94, of nylon thread or the like, which is trained over the rotatable sleeves 96 on guide pins 98, 100 and 102. Carried by cord 94 is an eyelet and pointer type indicator 104, which has a part secured to the cable, so as to move the eyelet, up and down on top of the transparent scale 74 centrally over the globe between the equator or horizon and zenith points in consonance with the angular pivotal movement of sighting device 10 and its mounting bracket 84 about shaft 82. If preferred, guide pins 98, 100, 102 and their sleeves 96 may extend from frame member 72 leftward in FIGURE 3 just to the right of the eyelet in indicator 104 so as not to interfere with sighting through the eyelet at any time. This embodiment of the guide pins is of course necessary when frame member 70 is not used.

In operation, the instrument is adjusted by means of bolt 32 so that the axis 20 of the globe is at the same elevation or angle with the horizon as the latitude of the instant location of the instrument on the earth. In the embodiment just described when in use in the northern hemisphere, the north pole of the globe must be pointing due south; and when in use in the southern hemisphere the south pole of the globe must be pointing due north. With this type of arrangement, the heavenly body indicator 104 can be on the same side of the globe as in the eyepiece 12 of the telescope. Before engaging the clock mechanism, the globe is positioned so that its meridian coincides with the celestial meridian of the observer. The correct sidereal time for so positioning the globe can readily be determined by rotating cover 54 until the date of observation on ring 67 is opposite the midnight point on fixed ring 58. Subject to adjustment, to correct for the distance of the observer east or west of the standard meridian of his time zone, the sidereal time throughout that day appears on ring 67 opposite the standard time markings on fixed ring 58. Clock motor 22 is then caused to make the globe rotate clockwise when the instrument is situated in the southern hemisphere and counterclockwise when it is in the northern hemisphere. Since ring 64 is rotatable, a person may move the telescope, and consequently the frame structure 68 to any desired azimuth position, which is then indicated by a pointer 106 on the adjacent azimuth scale on ring 58. As the telescope is then pivoted up or down to be directed on a particular star for example, the heavenly body indicator 104 correspondingly moves up or down and the eyelet or peephole therein encompasses the same star on the globe. It is therefore possible to identify that star. Alternatively, a particular star which one wishes to locate in the heavens can be found on the globe and encompassed by the eyelet of the indicator. Then, the telescope will automatically be trained on that star in the heavens.

With the eyepiece of a refractor or catadioptric telescope or the lower end of a sighting tube being on the same side of the globe as indicator 104, perfect coordination exists between any junction of right ascension and declination in the celestial dome or sky as seen through the line-of-sight sighting means and its corresponding junction of right ascension and declination on the celestial globular map visible through the eyelet in indicator 104. The telescope or other sighting means affixed to mounting bracket 84 does not impede a clear view of mapped objects through the eyelet in indicator 104 because bracket 84 is positioned off center, i.e., in a plane to the right of the central path over the globe traversed by the eyelet.

As a modification of the invention, FIGURES 4 and 5 ilustrate an arrangement for employing a Newtonian reflecting telescope 10', which has an eyepiece 12' at the end 13 which is directed toward the heavens. Because a person using such a telescope would be on the front side of the instrument, as opposed to the rear side of the instrument in FIGURE 1, it is desirable to have the indicator 104 move up and down the front side of the globe, between the front equator point 76' and zenith 78. In this embodiment cord 94' is directed frontwardly over the various rotatable sleeves 96 on the guide pins 108, 110, 112, 114, 116, and 118 so as to cause indicator 104 to move as required upon pivoting of telescope 10 and its mounting bracket 84, which revolves pulley 92 as previously indicated. The front half of transparent material 74' is scaled from 0° at point 76' to 90° at the zenith 78, since indicator 104 moves up the front side of the globe (on top of material 74' as in the prior embodiment).

The arrangement of FIGURES 4 and 5 for the reflecting type telescope is otherwise similar to that for the refracting type telescope, except that during use of the FIGURES 4 and 5 embodiment, the globe north and south poles 16 and 18 must point to their respective celestial pole stars.

If desired for purposes of making the instrument "ambidextrous" so as to be useable with either type of telescope, the cord and indicator arrangements shown in FIGURES 2 and 5 may be combined, with pulley 92 having another groove for the second cord. In other words, the two cords or cables 94 and 94' may be alternatively employed with indicators 104 on opposite sides of the globe, so that a purchaser for example, of the equipment could employ whichever type telescope he has, or could use the different types of telescopes alternately as desired.

As is clear from FIGURES 2 and 5, extension plate 80 extends sufficiently in an outward (horizontal) direction to allow the sighting device 10 or 10' to be in a vertical position without being impeded by cover 54, thereby permitting line-of-sight viewing of any segment of the sky with a refractor telescope or with a Newtonian reflector telescope without rotating the tube as must be done with an equatorial mount.

As a further modification, the globe of either embodiment may be interiorly lighted if desired. Preferably, cover 54 is utilized to bear descriptive data and interesting comments about the stars and other mapped celestial objects such as double stars, clusters, galaxies and nebulae. Informative data so related includes sidereal time for many stars as well as instructive information about physical characteristics such as size, density, temperature, speed in space, etc. Inasmuch as cover 54 may be rotated, it is possible for the observer to inform himself regarding the object he is viewing without changing position.

The feasible size of the instrument depends on various factors including, but not limited to, desired map area; length, diameter, type and weight of the telescope to be employed with the instrument; and the nature of anticipated use of the instrument. For example, a fifteen-inch globe gives a map area of approximately the same size and scale as the star charts in a popular star atlas which map over 9,000 stars, nebulae and clusters. An instrument constructed to include a globe of this size can easily accommodate a 5-inch catadioptric telescope, a 3-inch or 4-inch reflector or smaller refractor type telescope. An instrument so constructed and equipped would be most adequate for the amateur astronomer, for classroom as well as field instruction in astronomy and astro-navigation and for the casual star-gazer. The practical advantage of an instrument so constructed and equipped becomes evident when it is realized that without the use of star catalogs or other reference material for ascertaining right ascension, declination and other data, even a casual star gazer will be able to train his telescope without hesitation on any mapped celestial object, will be able to make instantaneous identification of a myriad of stars and will be able to refresh his recollection immediately regarding distinctive and noteworthy characteristics of scores of stars, clusters and nebulae.

An instrument constructed to include a smaller globe, for example, a nine-inch globe and equipped with a simple sighting tube or a relatively low priced telescope would serve as an educational/recreational device for younger people. An instrument of such smaller size would enable its user, among other things, to learn about the apparent diurnal movement of the universe, and to become acquainted with and learn scientific facts about all the stars of the first and second magnitudes, the constellations, some double stras and star clusters and the vagaries of the principal planets. Familiarity with the navigational stars and the meaning of the ecliptic would be gained. A small model such as this and without any sighting device but with a dated ecliptic inscribed on the globe would be of practical use to architects, for example, in demonstarting the angle of shadow cast by the sun at any hour, of any day in any locality.

The size and weight of some telescopes, for example Newtonian reflectors having a diameter greater than four inches, make it desirable to add an extension plate in the modification illustrated in FIGURES 4 and 5 to frame member 70, in a manner similar to plate 80, so as to support the telescope between said extension plates and centrally over the globe.

For telscopes too large to be mounted on an instrument of practical size, the instrument according to this invention is of immense practical value as auxiliary equipment anyhow. For example, with the altitude and azimuth readings obtainable from the instrument regarding any mapped object seen through the eyelet of the indicator, a cumbersome telescope on an ordinary alti-azimuth mounting, with alidades, can be directed, without groping, at such object even though it is not visible to the naked eye.

From the foregoing, it is therefore apparent that the objects and advantages herein mentioned have been provided for by this invention. Still other objects and advantages, and even further modifications of the invention, will become apparent to those of ordinary skill in the art upon reading this disclosure. For example, it is recognized that complex means exist whereby a telescope affixed to the mounting bracket can be electrically driven in azimuth and elevation in the manner of a tracking telecope. However, it is to be understood that this disclosure is intended to be exemplary and not limitative, the invention being defined by the appended claims.

What is claimed is:

1. Apparatus for identifying and locating heavenly bodies comprising:
   a globe having north and south poles and indicia representing said heavenly bodies,
   said indicia being disposed on said globe in the same relation relative to each other and to said poles as said heavenly bodies are relative to the corresponding north and south celestial poles,
   means for supporting said globe rotatably about its said poles with those globe poles being disposed, relative to horizontal, at an angle corresponding to the latitude of the instant location on the earth of said apparatus,
   frame means starddling the upper part of said globe and revolvable therearound and including means extending outwardly,
   a telescope having an eyepiece at one end,
   means pivotally secured on said outwardly extending means for mounting said telescope with said eyepiece more adjacent one side of the globe than the other, and
   a heavenly body indicator operatively connected with said pivotable mounting means to move in angular consonance with the pivoting of said telescope up and down said one side of said globe adjacent said frame means.

2. Apparatus as in claim 1 wherein said telescope is of the refracting type with its eyepiece being at the end opposite the telescope end which is pointed towards the heavens, whereby said heavenly body indicator is on the rear side of said globe, said globe poles being disposed at the angle of elevation of, and in a direction opposite to, their respective celestial poles.

3. Apparatus as in claim 2 wherein said telescope mounting means extends to the side of said outward extending means so that the telescope is in a plane different from the plane in which said heavenly body indicator moves.

4. Apparatus as in claim 1 wherein said telescope is of the reflecting type with said eyepiece being toward the end of the telescope which is pointed toward the heavens, said indicator therefore being on the front side of said globe, said globe poles being disposed toward the corresponding celestial poles at an elevation of said angle.

5. Apparatus as in claim 1 wherein said frame means centrally straddles the upper part of said globe and said heavenly body indicator is disposed to move between the waistline and zenith of said globe, said telescope being disposed by said mounting means to one side of the path of movement of said indicator.

6. Apparatus as in claim 1 wherein said frame means includes
   two spaced frame members at least one of which includes a plate as said outwardly extending means on which said mounting is pivotally secured,
   transparent means secured between said frame members and having degree markings between 0° and 90°,
   said indicator being arranged in the form of an eyelet and pointer disposed to indicate said degrees with the eyelet being over the center line of said globe to encompass the same heavenly body as said telescope sights,
   said indicator being operatively connected with said pivotable mounting means by a pulley and cable to which the indicator is secured, said pulley being connected via a gearing arrangement to said pivotable mounting means.

7. In apparatus for use with sighting means for identifying and locating heavenly bodies, the improvement comprising:
   a globe having north and south poles and indicia representing said heavenly bodies,
   said indicia being disposed on said globe in the same relation relative to each other and to said poles as said heavenly bodies are relative to the corresponding north and south celestial poles,
   means for supporting said globe rotatably about its said poles with those globe poles being disposed, relative to horizontal, at an angle corresponding to the latitude of the instant location on the earth of said apparatus,
   frame means straddling the upper part of said globe and revolvable therearound and including means extending outwardly,
   means pivotally secured on said outwardly extending means for mounting said sighting means with its eyepiece more adjacent one end of said straddling frame means than the other, and
   a heavenly body indicator operatively connected with said pivotable mounting means to move with the pivoting of said mounting means up and down one side of said globe adjacent said one end of the frame means.

8. Apparatus as in claim 7 wherein said outwardly extending means and mounting means extends horizontally sufficiently to allow said sighting means to clear said globe supporting means when the sighting means is pivoted to a vertical position.

9. Apparatus as in claim 7 including concentric first and second rings movable relative to each other and to said frame means and surrounding said globe supporting means, one of said rings having markings indicating the hours and minutes of a day, the other of said rings having markings indicating the months of a year and the days of each month along with the related sidereal time, whereby the sidereal time for any hour of any day may be determined.

10. Apparatus as in claim 9 wherein said one ring is fixed and said other ring rotates therearound, said one ring having further markings indicating azimuth, and pointer means connected to revolve with said frame means for cooperating with said azimuth markings.

11. Apparatus as in claim 7 wherein said sighting means has its eyepiece at the end opposite the end which is pointed towards the heavens, whereby said heavenly body indicator is on the rear side of said globe, said globe poles being disposed at the angle of elevation of, and in a direction opposite to, their respective celestial poles.

12. Apparatus as in claim 11 wherein said mounting means extends to the side of said outward extending means so that the sighting means is in a plane transversely spaced from the plane in which said heavenly body indicator moves.

13. Apparatus as in claim 7 wherein said sighting means has its eyepiece toward the end which is pointed toward the heavens, said indicator therefore being on the front of said globe, said globe poles being disposed toward the corresponding celestial poles at an elevation of said angle.

14. Apparatus as in claim 7 wherein said frame means centrally straddles the upper part of said globe and said heavenly body indicator is disposed to move between the horizon and zenith of said globe, said sighting means being disposed by said mounting means to one side of the path of movement of said indicator.

15. Apparatus as in claim 7 wherein
said frame includes at least one frame member which includes a plate as said outwardly extending means on which said mounting means is pivotally secured, transparent means disposed over said globe and having degree markings between horizon and zenith,
said indicator being arranged in the form of an eyelet and pointer disposed to indicate said degrees with the eyelet being over the center line of said globe to encompass the same heavenly body as said sighting means,
said indicator being operatively connected with said pivotable mounting means by a pulley and cable to which the indicator is secured.

References Cited by the Examiner
UNITED STATES PATENTS

| | | |
|---|---|---|
| 533,340 | 1/1895 | Beehler. |
| 1,146,412 | 7/1915 | Early _____ 33—62 |
| 2,337,587 | 12/1943 | Brocky _____ 33—61 |
| 2,697,280 | 12/1954 | Parker _____ 33—61 |
| 2,839,833 | 6/1958 | Hagner _____ 33—61 |
| 3,169,319 | 2/1965 | Hoffmeister _____ 33—61 |

ISAAC LISANN, *Primary Examiner.*

W. D. MARTIN, *Assistant Examiner.*